US012763507B2

(12) United States Patent
Degel et al.

(10) Patent No.: US 12,763,507 B2
(45) Date of Patent: Oct. 13, 2026

(54) CONTACTING DEVICE, METHOD OF MANUFACTURING A CONTACTING DEVICE AND ASSEMBLY

(71) Applicant: FRAUNHOFER-GESELLSCHAFT ZUR FÖRDERUNG DER ANGEWANDTEN FORSCHUNG E.V., Munich (DE)

(72) Inventors: Christian Degel, Sulzbach (DE); Steffen Tretbar, Sulzbach (DE)

(73) Assignee: Fraunhofer-Gesellschaft zur Förderung der angewandten Forschung E.V., Munich (DE)

( * ) Notice: Subject to any disclaimer, the term of this patent is extended or adjusted under 35 U.S.C. 154(b) by 325 days.

(21) Appl. No.: 18/292,460

(22) PCT Filed: Jul. 28, 2021

(86) PCT No.: PCT/EP2021/071171
§ 371 (c)(1),
(2) Date: Jan. 26, 2024

(87) PCT Pub. No.: WO2023/006196
PCT Pub. Date: Feb. 2, 2023

(65) Prior Publication Data
US 2024/0347952 A1 Oct. 17, 2024

(51) Int. Cl.
*H01R 13/22* (2006.01)
*B33Y 80/00* (2015.01)
(Continued)

(52) U.S. Cl.
CPC .............. *H01R 13/22* (2013.01); *B33Y 80/00* (2014.12); *H01R 31/06* (2013.01); *H01R 43/20* (2013.01)

(58) Field of Classification Search
CPC ......... H01R 13/22; H01R 31/06; B33Y 80/00
(Continued)

(56) References Cited

U.S. PATENT DOCUMENTS 5,161,984 A 11/1992 Taylor et al.
5,570,169 A * 10/1996 Hart .................. G03G 15/0818 399/285
(Continued)

FOREIGN PATENT DOCUMENTS

CN 107112674 A 8/2017
JP H10302924 A * 11/1998 ............ H01R 33/76
(Continued)

OTHER PUBLICATIONS

Jeff Strole et al.: "A Novel Flex Circuit Area-Array Interconnect System for a Catheter-Based Ultrasound Transducer", presented at IMAPS 2002, Denver, Colorado, Sep. 5, 2022.
(Continued)

*Primary Examiner* — Hae Moon Hyeon
(74) *Attorney, Agent, or Firm* — Kieran O'Leary; SPL Patent Attorneys PartG mbB

(57) ABSTRACT

A contacting device is proposed. The contacting device comprises a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors. A number of first electrical contact surfaces per unit area is different from a number of second electrical contact surfaces per unit area.

17 Claims, 6 Drawing Sheets

(51) Int. Cl.
*H01R 31/06* (2006.01)
*H01R 43/20* (2006.01)

(58) Field of Classification Search
USPC .................................... 439/733.1, 86, 91, 66
See application file for complete search history.

(56) References Cited

U.S. PATENT DOCUMENTS

| | | | | | |
|---|---|---|---|---|---|
| 5,649,834 | A * | 7/1997 | Allison | H01R 13/22 | 439/247 |
| 6,188,582 | B1 * | 2/2001 | Peter | H05K 3/3442 | 361/776 |
| 6,271,483 | B1 * | 8/2001 | Horiuchi | H10W 70/635 | 174/265 |
| 6,459,039 | B1 * | 10/2002 | Bezama | H10W 70/635 | 439/91 |
| 6,712,620 | B1 * | 3/2004 | Li | H01R 12/714 | 439/63 |
| 7,274,105 | B2 * | 9/2007 | Fairchild | H05K 1/0206 | 439/91 |
| 8,636,551 | B2 * | 1/2014 | Skidmore | H01R 13/111 | 439/843 |
| 8,988,895 | B2 * | 3/2015 | Mohammed | H05K 3/4602 | 439/91 |
| 9,653,832 | B2 * | 5/2017 | Higashitani | H01R 13/2407 | |
| 10,720,398 | B2 * | 7/2020 | Azumi | H10W 42/00 | |
| 2009/0069686 | A1 | 3/2009 | Daft et al. | | |
| 2020/0107816 | A1 | 4/2020 | Lee et al. | | |

FOREIGN PATENT DOCUMENTS

| | | | | |
|---|---|---|---|---|
| JP | 2013-008565 | | 1/2013 | |
| JP | 20138565 | A | 1/2013 | |
| WO | WO-2023006196 | A1 * | 2/2023 | H01R 43/20 |

OTHER PUBLICATIONS

Scott Corbett et al.: “Advanced Multilayer Polyimide Substrate Utilizing UV Laser Microvia Technology”, presented at IMAPS 2000, Boston, Massachusetts, Sep. 20, 2000.

* cited by examiner

CONTACTING DEVICE, METHOD OF MANUFACTURING A CONTACTING DEVICE AND ASSEMBLY

CROSS-REFERENCE TO RELATED APPLICATION

This application is a 35 U.S.C. § 371(c) national stage entry of PCT/EP2021/071171, filed on Jul. 28, 2021. The contents of this earlier filed application is incorporated by reference herein in its entirety.

TECHNICAL FIELD

The present disclosure deals with the electrical contacting of electrical components. In particular, embodiments relate to a contacting device, a method of manufacturing a contacting device and an assembly.

BACKGROUND

When setting up electrically operated devices such as sensors or actuators, it is often necessary to make electrical contact with components. This is often done by cabling. The smaller the components are and the more densely they are placed, the more difficult it is to make electrical contact using cables. Special cables, multi-layer boards or flex traces are only makeshift solutions if additional properties such as acoustic damping, controllable vibration modes or specific thermal conductive properties are desired. However, such properties are desirable for certain sensors or actuators and can hardly be influenced by the given possibilities of standard connection technologies and their material properties. In addition, sensor devices in particular often have to be placed in precisely defined arrangements.

Against this background, one task is to enable improved electrical contacting of electrical components.

BRIEF SUMMARY OF THE INVENTION

According to the invention, the problem is solved by a contacting device, a method of manufacturing a contacting device and an assembly according to the independent claims. Further aspects and further developments of the invention are described in the dependent claims, the following description and in the figures.

A first embodiment relates to a contacting device. The contacting device comprises a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors. A number of first electrical contact surfaces per unit area is different from a number of second electrical contact surfaces per unit area.

A second embodiment relates to a method of manufacturing a contacting device. The method comprises generating a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors. The number of first electrical contact surfaces per unit area is different from the number of second electrical contact surfaces per unit area.

A third embodiment relates to an assembly. The assembly comprises a contacting device according to the above embodiment and a plurality of electrical components. The plurality of electrical components is arranged on the first side. Electrical contacts of the plurality of electrical components each contact one of the plurality of first electrical contact surfaces.

The contacting device according to the invention, the method according to the invention of manufacturing a contacting device and the assembly according to the invention enable improved contacting of electrical components. In particular, electrical components arranged close together can be contacted and brought into contact with a given electrical connector (e.g., a plug).

BRIEF DESCRIPTION OF THE SEVERAL VIEWS OF THE DRAWINGS

Some examples of devices and/or methods will be described in the following by way of example only and with reference to the accompanying figures, in which.

DETAILED DESCRIPTION OF THE INVENTION

Figure 1:
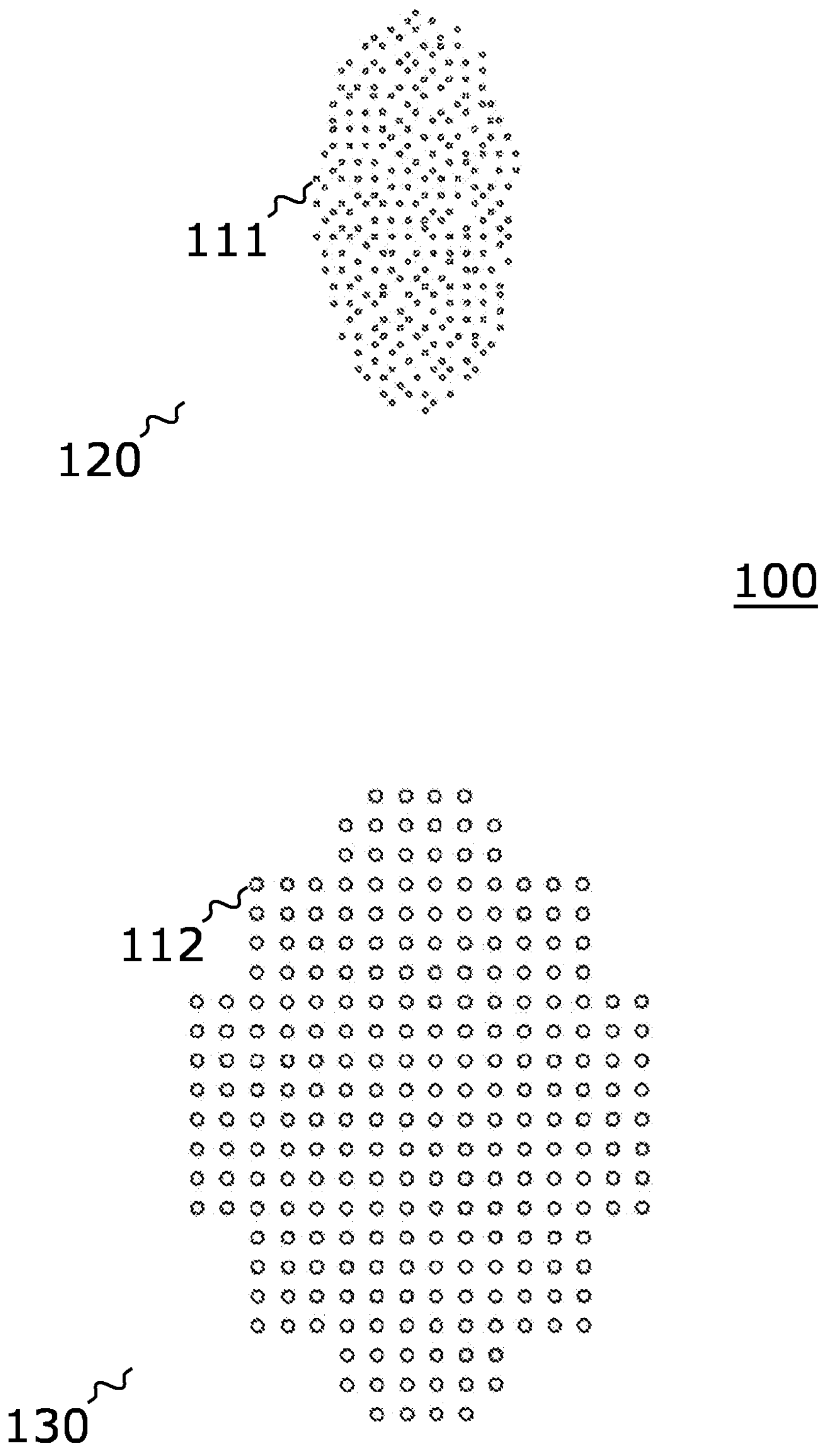
FIG. 1 illustrates a top view of a first side and a second side of an embodiment of a contacting device.

Some examples are now described in more detail with reference to the enclosed figures. However, other possible examples are not limited to the features of these embodiments described in detail. These may include modifications of the features as well as equivalents and alternatives to the features. Furthermore, the terminology used herein to describe certain examples should not be restrictive of further possible examples.

Throughout the description of the figures, same or similar reference numerals refer to same or similar elements and/or features, which may, in each case, be identical or implemented in a modified form while providing the same or a similar function. The thickness of lines, layers and/or areas in the figures may also be exaggerated for clarification.

When two elements A and B are combined using an ‘or’, this is to be understood as disclosing all possible combinations, i.e., only A, only B as well as A and B, unless expressly defined otherwise in the individual case. As an alternative wording for the same combinations, “at least one of A and B” or “A and/or B” may be used. This applies equivalently to combinations of more than two elements.

If a singular form, such as “a,” “an” and “the” is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms “include”, “including”, “comprise” and/or “comprising”, when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows in the upper area a top view of a first side 120 of a contacting device 100 and in the lower area a top view of a second side 130 of the contacting device 100, which differs from the first side 120. The first side 120 and the second side 130 may, for example, be parallel opposite sides of the contacting device 100. Alternatively, the first side 120 and the second side 130 may also be sides inclined to each other, in particular sides perpendicular to each other.

The contacting device 100 includes a plurality of electrical conductors 110 (e.g., integrally formed) extending from the first side 120 to the second side 130, so that a first electrical contact surface 111 is in each case formed on the first side 120 by a respective first end of each of the plurality of electrical conductors 110 and a second electrical contact surface 112 is in each case formed on the second side 130 by a respective second end of each of the plurality of electrical conductors. Due to the top views shown in FIG. 1, only the ends of the plurality of electrical conductors can in each case be seen, but not the body of the plurality of electrical conductors connecting the ends in each case.

The plurality of electrical conductors may include, for example, conductors made of metal (e.g., silver, copper, aluminum) or graphite. Each of the plurality of electrical conductors may consist entirely of electrically conductive material. Alternatively, one or more (e.g., all) of the plurality of electrical conductors may also consist of an electrically non-conductive material and an electrically conductive material. For example, a structure made of an electrically nonconductive material may be coated with an electrically conductive material to form one of the plurality of electrical conductors. The plurality of electrical conductors comprises $N \geq 2$ electrical conductors. For example, the plurality of electrical conductors may comprise at least 5, 10, 25, 50, 100, 250, 500, 1000 or more electrical conductors. The electrical conductors may all be built the same way (e.g., made of the same material and with the same structure) or different structures (e.g. made of different materials or with different structures).

The first electrical contact surfaces 111 as well as the second electrical contact surfaces 112 are each surfaces made of conductive material, which are contactable by other electrical components such as sensors, actuators, or plugs, in order to establish a respective electrically conductive connection to the electrical component.

A number of first electrical contact surfaces 111 per unit area (e.g., per 1 $mm^2$, per 10 $mm^2$, per 1 $cm^2$ or per 10 $cm^2$) is different from a number of second electrical contact surfaces 112 per unit area. In other words: The surface density of the first electrical contact surfaces 111 on the first side 120 is different from the surface density of the second electrical contact surfaces 112 on the second side 130. The number of first electrical contact surfaces 111 per unit area may differ from the number of second electrical contact surfaces 112 per unit area by a factor of at least 2, 3, 4, 5, 6, 7, 8, 9 or 10, for example. As shown in FIG. 1, the number of first electrical contact surfaces 111 per unit area may be higher than the number of second electrical contact surfaces 112 per unit area. In other words: The surface density of the first electrical contact surfaces 111 on the first side 120 may be greater than the surface density of the second electrical contact surfaces 111 on the second side 130. In alternative embodiments, however, the number of first electrical contact surfaces 111 per unit area may also be smaller than the number of second electrical contact surfaces 112 per unit area. The plurality of electrical conductors runs three-dimensionally in space in order to enable the different surface densities of the electrical contact surfaces on both sides 120, 130 of the contacting device 100.

The contacting device 100 provides a conductor structure with spatially variable density, which enables improved electrical contacting of electrical components. In particular, due to the different surface densities of the electrical contact surfaces on both sides 120, 130, electrical components may be arranged and contacted in high density on the one side of the contacting device 100, while on the other side of the contacting device 100, for example, conventional plug connectors or other electrical contacts may be used to conduct electrical signals to the electrical components and/or away from the electrical components.

In the embodiment of FIG. 1, the first electrical contact surfaces 111 are smaller than the second electrical contact surfaces 112. Alternatively, the second electrical contact surfaces 112 may also be smaller than the first electrical contact surfaces 111. In further alternative embodiments, the first electrical contact surfaces 111 and the second electrical contact surfaces 112 may also be of the same size.

In the embodiment of FIG. 1, the first electrical contact surfaces 111 are unevenly spaced apart from each other on the first side 120 (i.e., neighboring first electrical contact surfaces 111 are at different distances from each other), while the second electrical contact surfaces 112 are evenly spaced apart from each other on the second side 130 (i.e., neighboring second electrical contact surfaces 112 are at equal distances from each other). In other words: The first electrical contact surfaces 111 are irregularly arranged and/or distributed on the first side 120, while the second electrical contact surfaces 112 are regularly arranged and/or distributed on the second side 130. Alternatively, the first electrical contact surfaces 111 may also be evenly spaced apart from each other on the first side 120. Furthermore, the second electrical contact surfaces 112 may alternatively be unevenly spaced apart from each other on the second side 130.

Irrespective of whether the first electrical contact surfaces 111 and the second electrical contact surfaces 112 are spaced evenly or unevenly from each other, the first electrical contact surfaces 111 may, for example, have distances between 10 μm and 100 mm from each other and the second electrical contact surfaces 112 may, for example, have distances between 100 μm and 10 mm from each other.

A distance between the first side 120 and the second side 130, i.e., a height and/or thickness of the contacting device 100, may, for example, be between 5 mm and 100 mm.

For example, using the contacting device 100—as shown in FIG. 1—a conductor structure may be provided, one side of which offers a large and ordered arrangement of contact surfaces (contact pads), while the other side offers very small, closely spaced, and randomly arranged contact surfaces.

Figure 2:
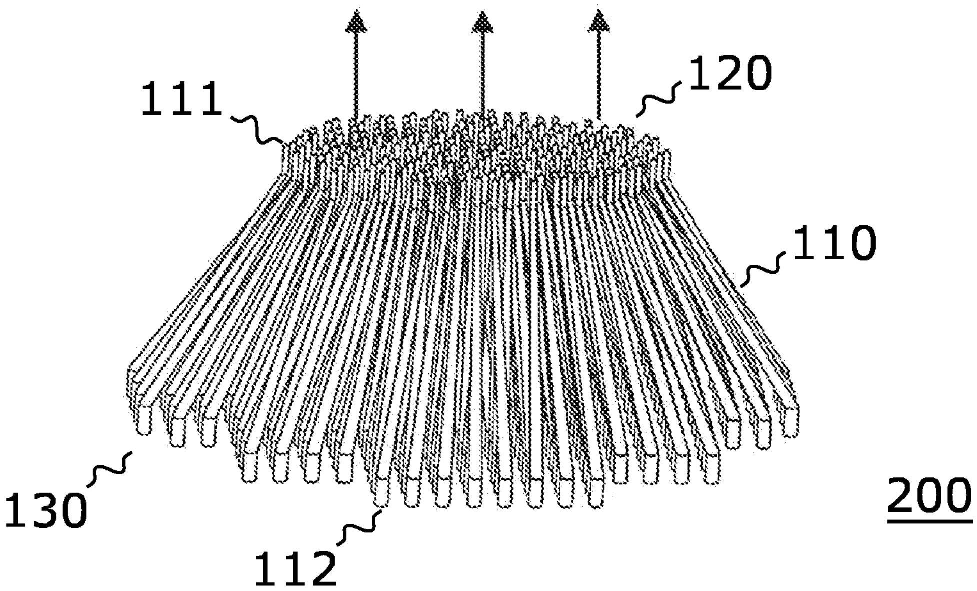
FIGS. 2 to 5 illustrate three-dimensional representations of various embodiments of a contacting device.

FIG. 2 shows a three-dimensional view of another contacting device 200. FIG. 2 illustrates the three-dimensional course of the plurality of electrical conductors 110 in space.

Similar to the contacting device 100 shown in FIG. 1, the number of first electrical contact surfaces 111 per unit area is also higher than the number of second electrical contact surfaces 112 per unit area in the contacting device 200 shown in FIG. 2.

In the example of FIG. 2, the first electrical contact surfaces 111 are located in a planar surface. Similarly, the second electrical contact surfaces are located in a planar surface. The planar surface in which the first electrical contact surfaces 111 are located runs essentially parallel to the planar surface in which the second electrical contact surfaces 112 are located. The planar surface in which the first electrical contact surfaces 111 are located forms the first side 120 of the contacting device 200, while the planar surface in which the second electrical contact surfaces 112 are located forms the second side 130 of the contacting device 200. The first side 120 and the second side 130 are thus parallel opposite sides of the contacting device 200.

Figure 3:
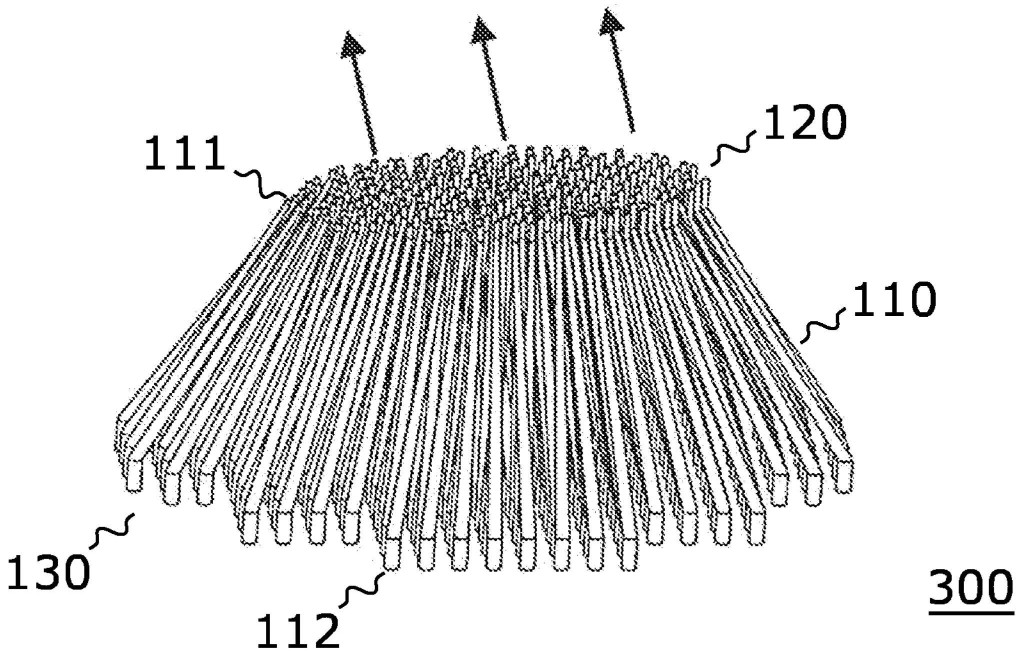

FIG. 3 illustrates a modification of the contacting device 200. In the contacting device 300 shown in FIG. 3, the first electrical contact surfaces 111 also are located in a planar surface, which forms the first side 120 of the contacting device 200. In contrast to the example in FIG. 2, however, the planar surface in which the first electrical contact surfaces 111 are located is inclined relative to the planar surface in which the second electrical contact surfaces 112 are located. In other words: The first side 120 and the second side 130 of the contacting device 300 are sides inclined towards each other.

Figure 4:
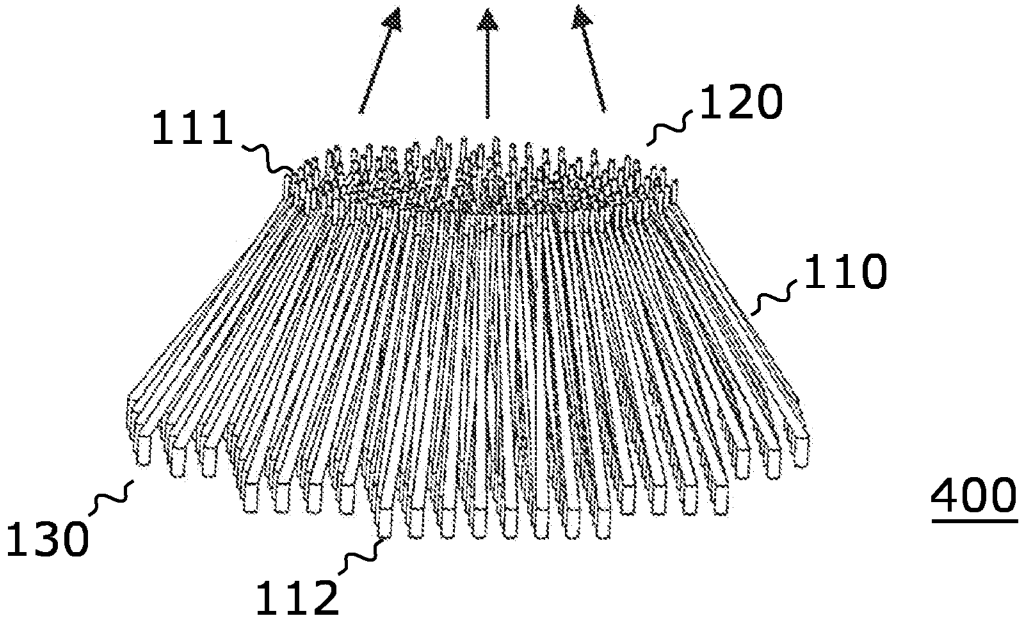

FIG. 4 shows a further contacting device 400 in which the first electrical contact surfaces 111, in contrast to the examples of FIG. 2 and FIG. 3, are not located in a planar surface, but in a free-form surface. In the contacting device 400 shown in FIG. 4, the free-form surface in which the first electrical contact surfaces 111 are located is essentially a concave surface that is curved towards the center and/or center of mass of the contacting device 400. The second electrical contact surfaces 112 are again located in a planar surface.

The free-form surface in which the first electrical contact surfaces 111 are located forms the first side 120 of the contacting device 200, while the planar surface in which the second electrical contact surfaces 112 are located forms the second side 130 of the contacting device 200.

Figure 5:
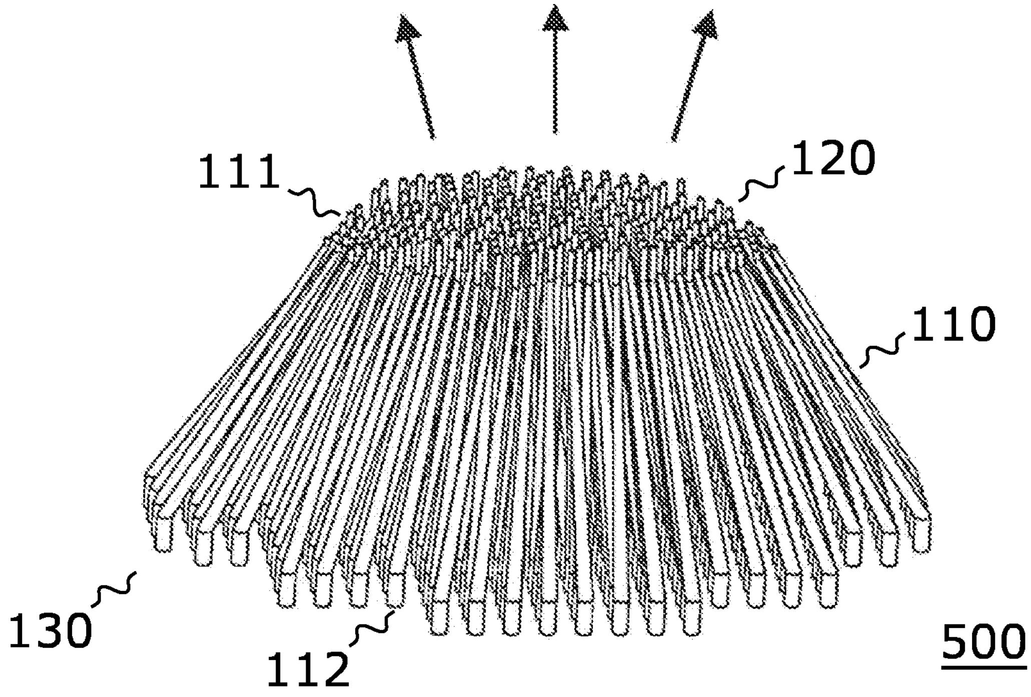

FIG. 5 shows an alternative contacting device 500, in which the first electrical contact surfaces 111 are again located in a free-form surface. In contrast to the example of FIG. 4, the freeform surface in FIG. 5 is a substantially convex surface that is curved away from the center and/or center of mass of the contacting device 500.

Although the second electrical contact surfaces 112 in each of the above embodiments were located in a planar surface, the present disclosure is by no means limited thereto. Alternatively, the second electrical contact surfaces 112 may also be located in a free-form surface. In this disclosure, a free-form surface is understood to be a surface the shape of which is only roughly determined and/or determinable, e.g., by control points to be approximated and boundary curves to be interpolated. Similarly, both the first electrical contact surfaces 111 and the second electrical contact surfaces 112 may each be located in a curved surface that is exactly describable by means of a mathematical function.

In the above embodiments, all of the plurality of electrical conductors 110 extended completely from the first side 120 to the second side 130 to form respective first and second electrical contact surfaces 111 and 112 on the two sides 120 and 130. In some embodiments, a contacting device according to the invention may also comprise further electrical conductors that do not extend completely from the first side 120 to the second side 130, or vice versa.

Accordingly, a respective end of one of the further conductors forms a first electrical contact surface on the first side 120 or a second electrical contact surface on the second side 130, but the respective other end of the further conductor does not form an electrical contact surface on the respective other side of the contacting device. The other conductors thus run from the first side 120 or the second side 130 to the respective other side, but already end inside the contacting device before reaching the respective other side.

A respective electrical conductor of the plurality of electrical conductors 110 may be both a rigid conductor and flexible conductor. Mixed forms are also possible, i.e., a respective electrical conductor of the plurality of electrical conductors 110 may have at least one rigid section (partial area) and at least one flexible section (partial area).

Figure 6:
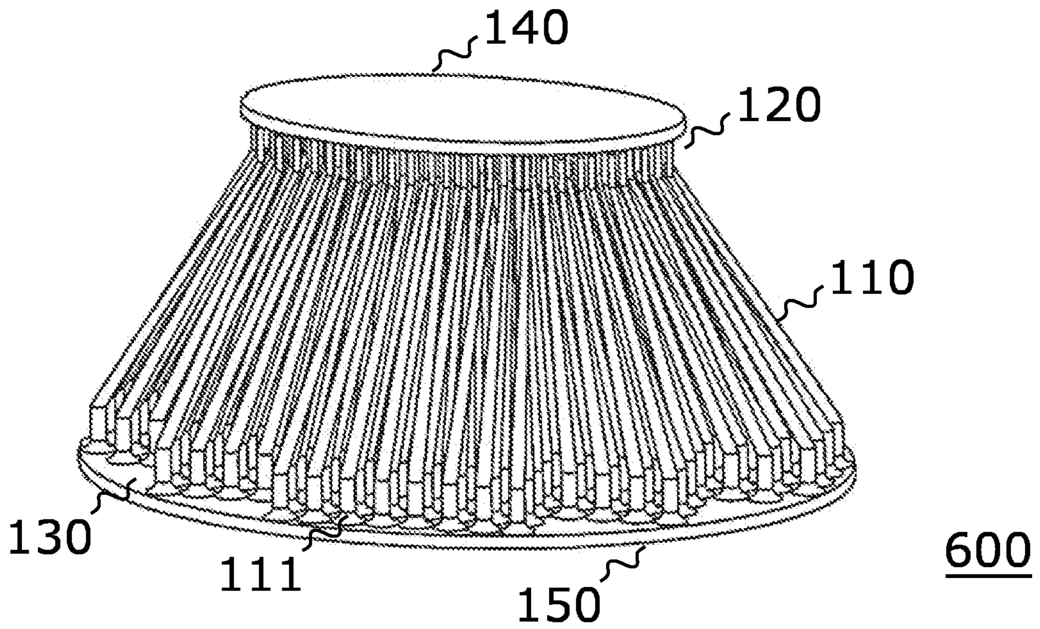
FIG. 6 illustrates a three-dimensional representation of an embodiment of a contacting device with transport carriers.

FIG. 6 shows a further contacting device 600 and additionally two transport carriers 140 and 150. The respective first end of each of the plurality of electrical conductors 110 is formed on and/or mechanically and/or materially connected to the first transport carrier 140 to mechanically connect the individual electrical conductors to each other. Similarly, the respective second end of each of the plurality of electrical conductors 110 is formed on and/or mechanically and/or materially connected to the second transport carrier 150. In other words: The first transport carrier 140 interconnects the plurality of electrical conductors 110 on the first side 120, while the second transport carrier 150 interconnects the plurality of electrical conductors 110 on the second side 130.

A respective space between individual ones of the plurality of electrical conductors 110 is empty. In other words: The space between the plurality of electrical conductors 110 is empty and/or not filled with material.

When manufacturing the contacting device 600, the plurality of electrical conductors 110 may be formed three-dimensionally on the first transport carrier 140 or the second transport carrier 150, for example. The respective other transport carrier may then be applied in order to avoid bending or damaging individual ones of the plurality of electrical conductors 110 before further processing. Alternatively, only one transport carrier may be used, i.e., either the first transport carrier 140 or the second transport carrier 150.

Figure 7:
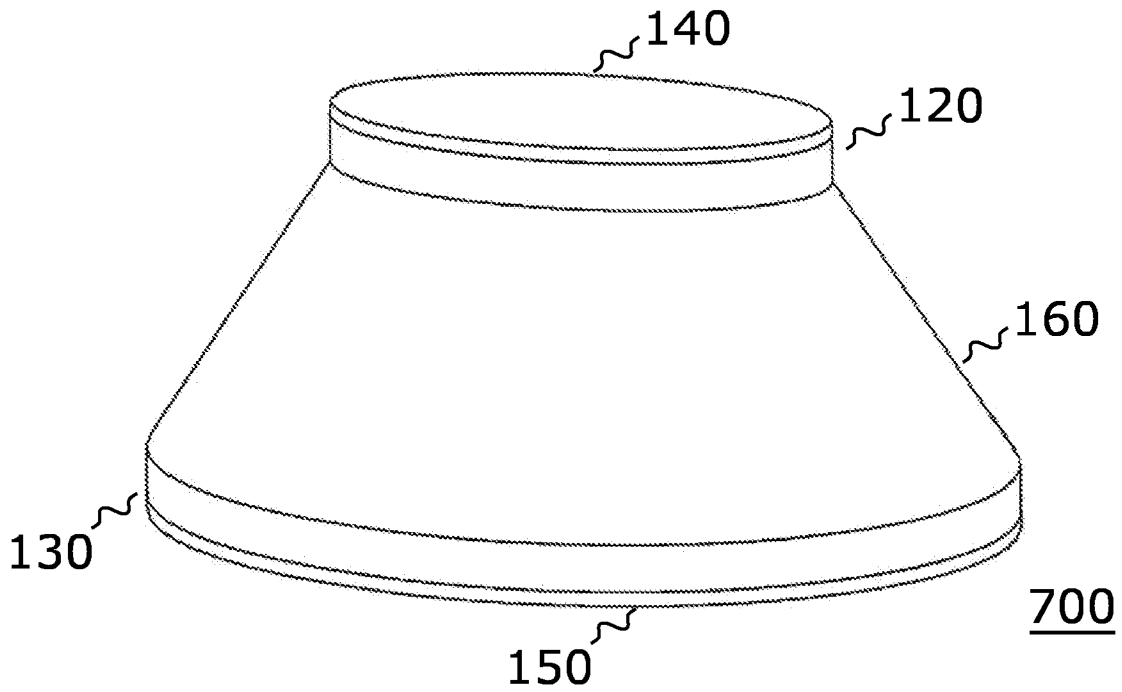
FIG. 7 illustrates a three-dimensional representation of an embodiment of a contacting device with transport carriers and carrier material.

FIG. 7 shows a further contacting device 700 in which—in contrast to the embodiment of FIG. 6—the plurality of electrical conductors is embedded in a carrier material 160. For example, the contacting device 700 may be obtained by filling the gaps between the individual electrical conductors of the plurality of electrical conductors 110 of the contacting device 600 shown in FIG. 6 by casting with a material.

The carrier material 160 may have a desired property, for example, to obtain a desired electrical, magnetic, optical and/or acoustic property of the contacting device 700. For example, a modulus of elasticity of the contacting device 700, a density of the contacting device 700, a speed of sound within the contacting device 700, a radiation absorption characteristic of the contacting device 700 or a magnetic permeability of the contacting device 700 may be adjusted via the carrier material 160. It is understood that any other desired property of the contacting device 700 may also be adjusted by selecting a suitable material for the carrier material 160.

Figure 8:
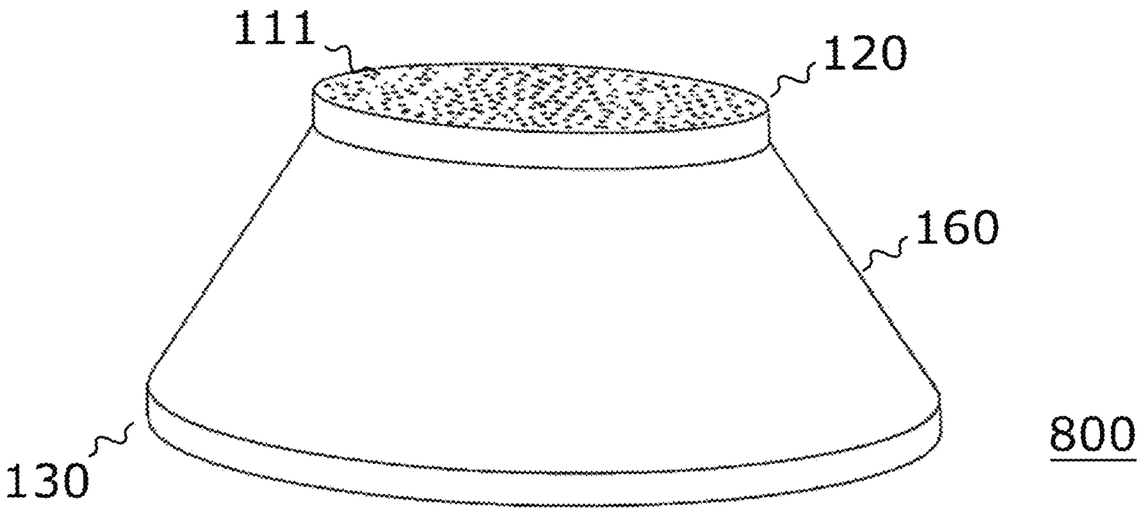
FIG. 8 illustrates a three-dimensional representation of an embodiment of a contacting device with carrier material.

The transport carriers 140 and 150 may be plate-like and/or planar elements, as shown in FIG. 7 and FIG. 8. Accordingly, the first electrical contact surfaces 111 and/or the second electrical contact surfaces 112 then are located in a respective planar surface. If the first electrical contact surfaces 111 and/or the second electrical contact surfaces 112 are to be located in a respective free-form surface, the respective surface of the transport carrier 140 and/or 150 may also be formed as a corresponding free-form surface.

FIG. 8 shows a further contacting device 800 in which—in contrast to the embodiment example of FIG. 7—the transport carriers 140 and 150 are removed, so that the first contact surfaces 111 on the first side 120 are recognizable. Due to the perspective chosen, the second contact surfaces on the second side 130 are not recognizable.

The contacting device 800 may enable improved electrical contacting of electrical components due to the different surface densities of the electrical contact surfaces on both sides 120, 130 and due to the carrier material 160 selected on the basis of the desired properties of the contacting device 800.

Figure 9:
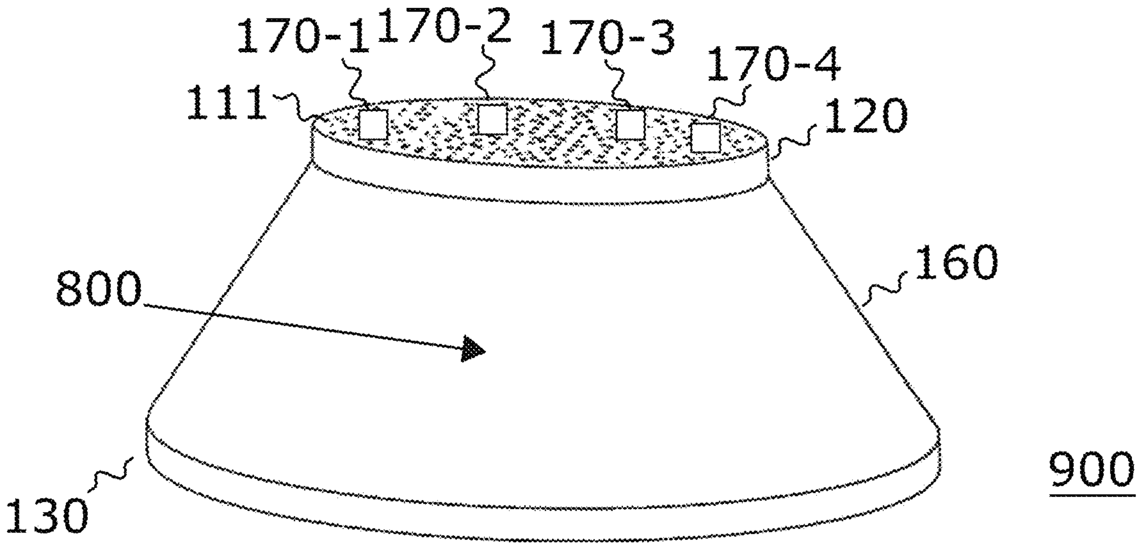
FIG. 9 illustrates a three-dimensional representation of an embodiment of an assembly.

An assembly 900, which comprises the contacting device 800 and a plurality of electrical components 170-1, . . . , 170-4, is shown in FIG. 9. The plurality of electrical components 170-1, . . . , 170-4 is arranged on the first side 120. Electrical contacts of the plurality of electrical components 170-1, . . . , 170-4 each contact one of the plurality of first electrical contact surfaces 111 on the first side 120 of the contacting device 800. For example, the electrical contacts of the plurality of electrical components 170-1, . . . , 170-4 may each contact one of the plurality of first electrical contact surfaces 111 via a respective solder connection.

For example, conventional plug connectors or other electrical contacts may be contacted via the second electrical contact surfaces 112 on the second side 120 of the contacting device 800 to conduct electrical signals to the plurality of electrical components 170-1, . . . , 170-4 and/or away from the electrical components.

The plurality of electrical components 170-1, . . . , 170-4 may comprise, for example, a plurality of sensors and/or a plurality of actuators. The sensors may be, for example, ultrasonic sensors for volume imaging, sonar antennas or multi-element sensors with an irregular arrangement in the surface, i.e., on the first side 120 of the contacting device 800. The actuators may be, for example, ultrasonic therapy actuators (e.g., for the use in volumes), sonar antennas or ultrasonic transducers for non-destructive testing applications. It is understood that the foregoing examples are merely illustrative of possible applications and the present disclosure is not limited thereto. In principle, any type of sensor and/or actuator may be contacted by means of the contacting device according to the invention and/or form a corresponding assembly with the same. The number of electrical components has also been selected purely as an example. The number of electrical components is generally $M \geq 2$. For example, at least 5, 10, 25, 50, 100, 250, 500, 1000 or more electrical components may be arranged on the first side 120. In the embodiments of FIG. 8 and FIG. 9, the first electrical contact surfaces 111 are arranged on the first side of the contacting device 800 in a planar surface. Alternatively, the first electrical contact surfaces 111 may also be arranged in a free-form surface, so that the plurality of electrical components 170-1, . . . , 170-4 may, for example, be arranged irregularly in the volume (e.g., to adapt to a predetermined geometry).

Instead of the contacting device 800, any other contacting device according to the invention may also be used for an assembly according to the invention.

Figure 10:
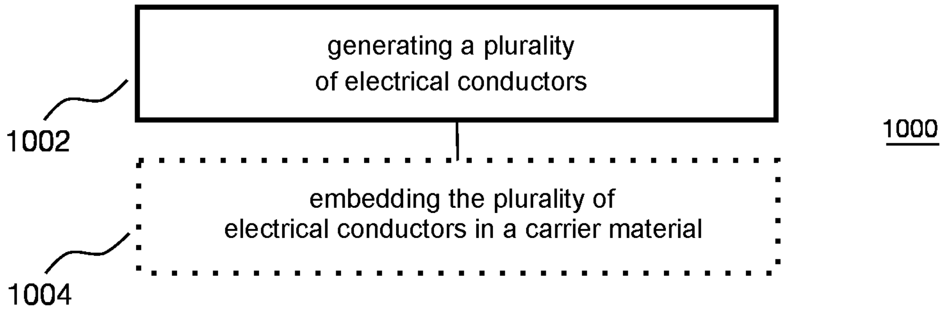
FIG. 10 illustrates a flow diagram of an embodiment of a method of manufacturing a contacting device.

The manufacture of a contacting device according to the invention is described in more detail below with reference to FIG. 10. FIG. 10 illustrates a flow diagram of a method 1000 of manufacturing a contacting device.

The method 1000 comprises generating 1002 a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors. The number of first electrical contact surfaces per unit area is different from the number of second electrical contact surfaces per unit area.

The method 1000 enable the manufacture of a contacting device that enables improved electrical contacting of electrical components due to the different surface densities of the electrical contact surfaces on both sides.

Optionally, the method 1000 may further comprise embedding 1004 the plurality of electrical conductors in a carrier material. The carrier material may, for example, be selected depending on a desired mechanical, electrical, magnetic, optical and/or acoustic property of the contacting device. For example, a modulus of elasticity of the contacting device, a density of the contacting device, a speed of sound within the contacting device, a radiation absorption characteristic of the contacting device or a magnetic permeability of the contacting device may be adjusted via the carrier material. It is understood that any other desired property of the contacting device may also be adjusted by selecting a suitable material for the carrier material.

When generating 1002 the plurality of electrical conductors, the respective first end of the plurality of electrical conductors or the respective second end of the plurality of electrical conductors may, for example, be formed on a transport carrier, wherein a respective space between individual ones of the plurality of electrical conductors remains initially empty. This allows the individual electrical conductors to be mechanically connected to each other in order to define the alignment of the individual electrical conductors to each other. Optionally, the respective other end of each of the plurality of electrical conductors may also be mechanically and/or materially connected to a further transport carrier in order to define and/or fix the alignment of the individual electrical conductors to one another. Subsequently, embedding 1004 the plurality of electrical conductors in the carrier material may be carried out, for example, by casting with a material that has the desired properties. After embedding 1004 the plurality of electrical conductors in the carrier material, the at least one transport carrier is then removed in order to obtain the contacting device.

Alternatively, generating 1002 the plurality of electrical conductors and embedding 1004 the plurality of electrical conductors in the carrier material may be performed simultaneously and/or concurrently by means of an additive manufacturing method. An additive manufacturing method is a manufacturing method in which an object such as the contacting device—in contrast to subtractive methods—is built up automatically by adding volume elements or layers under computer control and/or directly from digital 3D data, or in which additional volume elements are built up on an existing workpiece such as a transport carrier. One feature of an additive manufacturing method is the elimination of product-specific tools and preparations ("tool-free manufacturing"). Additive manufacturing is also known as "3D printing" or "generative manufacturing".

During the additive manufacturing method, an object such as the contacting device is built up from one or more liquid and/or solid materials, e.g., layer by layer. Plastics, synthetic resins, ceramics, metals, carbon or graphite materials, for example, may be used as a material for additive manufacturing methods. During the build-up of an object such as the contacting device, physical or chemical hardening and/or melting processes take place in order to gradually shape an object such as the contacting device.

The additive manufacturing method used to generate 1002 the plurality of electrical conductors and embed 1004 the plurality of electrical conductors in the carrier material may be any additive manufacturing method. For example, the following additive manufacturing methods may be used: Fused Deposition Modeling (FDM, or Fused Filament Fabrication, FFF), Stereolithography (SL and/or SLA), Selective Laser Sintering (SLS), Selective Laser Melting (SLM, or Laser Powder Bed Fusion, LPBF), (Selective) Electron Beam Melting (S)EBM, Multi-Jet Modeling (MJM), Poly-Jet Modeling (PJM), Binder Jetting, Laminated Object Manufacturing (LLM) or Digital Light Processing (DLP). However, it should be noted that the additive manufacturing methods listed above are selected as examples and are purely for illustrative purposes. Similarly, any other additive manufacturing method may be used to generate 1002 the plurality of electrical conductors and embed 1004 the plurality of electrical conductors in the carrier material.

For example, a combination printing of electrically conductive and electrically non-conductive materials may be used to generate 1002 the plurality of electrical conductors and to embed 1004 the plurality of electrical conductors in the carrier material. For example, one or more metals may be used as the electrically conductive material and a material with the desired backing, damping or other properties may be selected as the electrically non-conductive material. Combination printing is advantageous in that it does not have to be filled with the carrier material in a separate method step, but such carrier material is printed at the same time.

The method 1000 of manufacturing a contacting device and/or structure makes it possible to provide a contacting device and/or structure which allows electrical components (e.g., ultrasonic transducers) to be electrically contacted in a free and/or arbitrary arrangement and at high density. A suitable choice of the carrier material may provide an optimized carrier material for the sensors and/or actuators, so that the sensor properties are superior to conventionally contacted sensors. The surface density of the second electrical contact surfaces on the second side of the contacting device allows, for example, the use of conventional plug connectors and methods for their application, so that, by means of the contacting device generated, cost-effective and safe plug connectors may also be used for the electrical contacting of electrical components arranged in a free arrangement and in high density.

The aspects and features described in relation to a particular one of the previous examples may also be combined with one or more of the further examples to replace an identical or similar feature of that further example or to additionally introduce the features into the further example.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects in the previous sections have been described in relation to a device or system, these aspects should also be understood as a description of the corresponding method. In this case, for example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that—although in the claims a dependent claim refers to a particular combination with one or more other claims—other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The research work that led to these results was funded by the European Union.

The invention claimed is:

1. An electrical component assembly comprising:

a contacting device comprising:

a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors, wherein a number of first electrical contact surfaces per unit area is different from a number of second electrical contact surfaces per unit area, and wherein the plurality of electrical conductors is embedded in a carrier material so that gaps between individual electrical conductors of the plurality of electrical conductors are filled with the carrier material; and a plurality of electrical components, wherein the plurality of electrical components is arranged on the first side, and wherein electrical contacts of the plurality of electrical components each contact one of the plurality of first electrical contact surfaces, and wherein the plurality of electrical components comprises a plurality of sensors and/or a plurality of actuators.

2. The electrical component assembly of claim 1, wherein the number of first electrical contact surfaces per unit area differs at least by a factor of 2 from the number of second electrical contact surfaces per unit area.

3. The electrical component assembly of claim 1, wherein the number of first electrical contact surfaces per unit area is higher than the number of second electrical contact surfaces per unit area.

4. The electrical component assembly of claim 1, wherein the first electrical contact surfaces are unevenly spaced apart from each other.

5. The electrical component assembly of claim 1, wherein the first electrical contact surfaces are located in a planar surface.

6. The electrical component assembly of claim 1, wherein the first electrical contact surfaces are located in a free-form surface.

7. The electrical component assembly of claim 1, wherein the second electrical contact surfaces are located in a planar surface.

8. The electrical component assembly of claim 1, wherein the second electrical contact surfaces are evenly spaced apart from each other.

9. The electrical component assembly of claim 1, wherein the second electrical contact surfaces are unevenly spaced apart from each other.

10. The electrical component assembly of claim 1, wherein the first electrical contact surfaces are smaller than the second electrical contact surfaces.

11. The electrical component assembly of claim 1, wherein the second electrical contact surfaces are smaller than the first electrical contact surfaces.

12. The electrical component assembly of claim 1, wherein the plurality of electrical conductors extends three-dimensionally in space.

13. A method of manufacturing an electrical component assembly, the method comprising:

manufacturing a contacting device, comprising:

generating a plurality of electrical conductors extending from a first side of the contacting device to a second side of the contacting device different from the first side, so that a first electrical contact surface is in each case formed on the first side by a respective first end of each of the plurality of electrical conductors and a second electrical contact surface is in each case formed on the second side by a respective second end of each of the plurality of electrical conductors, wherein the number of first electrical contact surfaces per unit area is different from the number of second electrical contact surfaces per unit area, and embedding the plurality of electrical conductors in a carrier material so that gaps between individual electrical conductors of the plurality of electrical conductors are filled with the carrier material; and arranging a plurality of electrical components on the first side of the contacting device, wherein electrical contacts of the plurality of electrical components each contact one of the plurality of first electrical contact surfaces, and wherein the plurality of electrical components comprises a plurality of sensors and/or a plurality of actuators.

14. The method of claim 13, wherein the carrier material is selected depending on a desired mechanical, electrical, magnetic, optical and/or acoustic property of the contacting device.

15. The method of claim 13, wherein generating the plurality of electrical conductors and embedding the plurality of electrical conductors in the carrier material is carried out by means of an additive manufacturing method.

16. The method of claim 13, wherein, when generating the plurality of electrical conductors, the respective first end of the plurality of electrical conductors or the respective second end of the plurality of electrical conductors is formed on a transport carrier, and wherein a respective space between individual ones of the plurality of electrical conductors is empty.

17. The method of claim 16, wherein the method further comprises removing the transport carrier after embedding the plurality of electrical conductors in the carrier material.

* * * * *